US009908511B2

(12) United States Patent
Izabel

(10) Patent No.: US 9,908,511 B2
(45) Date of Patent: Mar. 6, 2018

(54) WINDSCREEN WIPER FIXING DEVICE AND WIPING SYSTEM COMPRISING SAID FIXING DEVICE

(71) Applicant: Valeo Systèmes d'Essuyage, Le Mesnil Saint Denis (FR)

(72) Inventor: Vincent Izabel, Chilly Mazarin (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 31 days.

(21) Appl. No.: 14/276,550

(22) Filed: May 13, 2014

(65) Prior Publication Data

US 2014/0331436 A1    Nov. 13, 2014

(30) Foreign Application Priority Data

May 13, 2013    (FR) ..................................... 13 54279

(51) Int. Cl.
  *B60S 1/38*    (2006.01)
  *B60S 1/40*    (2006.01)
  *B60S 1/52*    (2006.01)

(52) U.S. Cl.
  CPC ........... *B60S 1/4038* (2013.01); *B60S 1/3862* (2013.01); *B60S 1/4048* (2013.01); *B60S 1/524* (2013.01); *B60S 2001/4051* (2013.01); *B60S 2001/4058* (2013.01)

(58) Field of Classification Search
  CPC ........................... B60S 1/4038–1/4048; B60S 2001/4051–2001/14061; B60S 1/4064
  USPC ..................................... 15/250.32
  See application file for complete search history.

(56) References Cited

U.S. PATENT DOCUMENTS

| 8,191,200 | B2* | 6/2012 | Kim ..................... B60S 1/387 15/250.201 |
| 2006/0059647 | A1 | 3/2006 | Ostrowski |
| 2008/0134455 | A1* | 6/2008 | Kinnaert .................. B60S 1/40 15/250.32 |

(Continued)

FOREIGN PATENT DOCUMENTS

| DE | 102010052315 A1 * | 5/2012 | ............ B60S 1/3851 |
| DE | 202010017467 U1 | 5/2012 | |
| FR | 2981622 A1 | 4/2013 | |

OTHER PUBLICATIONS

DE102010052315 A1 (machine translation), 2012.*
Office Action issued in corresponding Mexican Application No. MX/a/2014/005859, mailed Jul. 20, 2016 (6 pages).

*Primary Examiner* — Andrew A Horton
(74) *Attorney, Agent, or Firm* — Osha Liang LLP

(57) ABSTRACT

The invention relates to a device for fixing a windscreen wiper (16) to a drive arm (12) of a wiping system (10), said device comprising a terminal part (14) of an arm (12), a connector (20) intended to be fixed to the wiper (16), a coupling adapter (50) for coupling the connector (20) to said arm (12), and an intermediate part (40), said adapter (50) comprising means for holding it onto the arm in a nominal immobilizing position, said intermediate part (40) being mobile in said terminal part (14) relative to the adapter (50), and comprising means for releasing and/or locking said holding means, so as to allow the adapter (50) to be mounted on and/or removed from the arm (12) and/or so as to retain the adapter (50) on the arm (12) in the nominal immobilizing position.
The invention also relates to a wiping system (10) comprising such a fixing device.

7 Claims, 12 Drawing Sheets

(56) References Cited

U.S. PATENT DOCUMENTS

Figure 1:
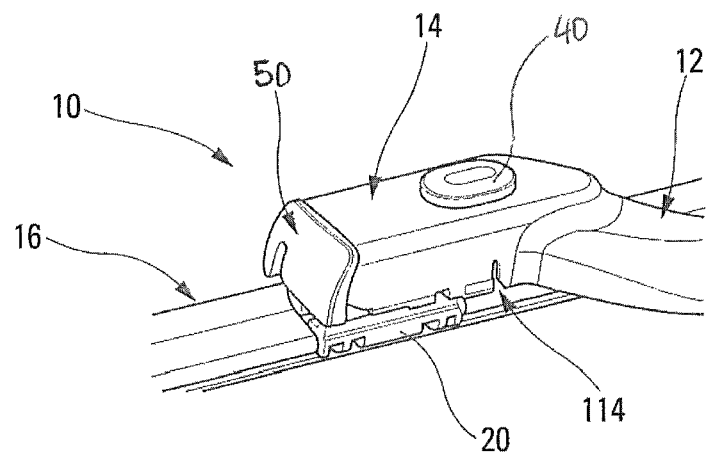

2008/0289133 A1* 11/2008 Kim ...................... B60S 1/387
15/250.32

* cited by examiner

WINDSCREEN WIPER FIXING DEVICE AND WIPING SYSTEM COMPRISING SAID FIXING DEVICE

The field of the present invention is that of equipment for vehicles, and more particularly that of equipment for wiping the windscreen of vehicles.

Motor vehicles are routinely equipped with windscreen wiper systems for freeing the windscreen of anything that could block the vision of the passengers of the vehicle, in particular of its driver. These windscreen wipers conventionally comprise a drive arm, describing an angular reciprocal movement, and elongate wipers, themselves bearing scraper blades made of an elastic material. These blades rub against the windscreen and dispel the water by taking it out of the field of vision of the driver. The wipers are produced in the form, either, in a conventional version, of articulated stirrups which hold the scraper blade at a number of discrete points by conferring on it a bend enabling it to closely follow any curvature of the windscreen, or, in a more recent version, called "flat blade", of a semi-rigid assembly which holds the scraper blade over its entire length by virtue of one or more bending vertebrae making it possible to press the wiper onto the windscreen without having to use stirrups.

In both solutions, the wiper is attached to the windscreen wiper arm by a fixing device consisting of a connector and an adapter. The connector is a part which is directly crimped onto the wiper whereas the adapter is an intermediate part which enables the connector to be fixed onto the windscreen wiper arm. These two parts are linked to one another by a transverse articulation axis which allows their relative rotation, in a plane at right angles to the windscreen passing through the arm.

The immobilization of the adapter in the arm is currently ensured by an immobilizing pin which is housed in an opening of the arm. This immobilizing pin belongs to the adapter and is situated at the end of a flexible tongue.

There is an interest in providing an immobilizing of the adapter in the arm that offers enhanced reliability.

To this end, the subject of the invention is a device for fixing a windscreen wiper to a drive arm of a wiping system, said device comprising a terminal part of an arm, a connector intended to be fixed to the wiper, a coupling adapter for coupling the connector to said arm, and an intermediate part, said adapter comprising means for holding it onto the arm in a nominal immobilizing position, said intermediate part being mobile in said terminal part relative to the adapter, and comprising means for releasing and/or locking said holding means, so as to allow the adapter to be mounted on and/or removed from the arm and/or so as to retain the adapter on the arm in the nominal immobilizing position.

In other words, a displacement of said intermediate part in the arm is suitable for allowing the release of said holding means. The use of a dedicated part makes it possible to increase the reliability of the holding of the adapter in the arm.

According to different embodiments of the invention, which will be able to be taken together or separately:
said adapter is linked to the connector with a degree of freedom in rotation about a first axis of rotation,
said adapter and said intermediate part are two distinct elements,
said adapter is configured to be mounted on the arm between a direction, called direction of mounting/removal, situated in a plane at right angles to said first axis of rotation,
said intermediate part is translationally mobile in the arm in said direction of mounting/removal,
said intermediate part, then called lever, is rotationally mobile about a second axis of rotation,
said second axis of rotation belongs to the terminal part and is parallel to the first axis of rotation,
the releasing means are configured to act on the holding means so as to retract them when the adapter is mounted on and/or removed from the arm,
the holding means comprise at least one abutment that can be retracted in a direction, called direction of retraction,
said direction of retraction comprises a component parallel to said axis of rotation,
the releasing means comprise at least one cam acting on the abutment or abutments so as to drive it/them in said direction of retraction,
the holding means comprise at least one snug that can be retracted in said direction of retraction,
said snugs are suitable for being housed in a nominal immobilizing position inside one or more openings produced in the arm,
the locking means comprise at least one protruding part made of the same material as the body of the lever,
said protruding part or parts define an abutment suitable for preventing the retraction of said snug or snugs into the nominal immobilizing position,
said snug or snugs and/or said opening or openings is/are configured to allow the retraction of said snug or snugs out of said opening or openings,
the abutment or abutments and/or the snug or snugs is/are situated on a tab made of the same material as the adapter,
said tab or tabs of the adapter is/are configured to bend so as to allow the retraction of said snug or snugs,
the cam or cams act on the abutment or abutments in such a way as to extract the snug or snugs from the opening or openings of the arm,
the cam or cams drive the bending of said tab or tabs of the adapter,
said openings are emergent,
said snugs and said openings have respective sizes preventing manipulation of said snugs,
said intermediate part can be accessed in the nominal position and when mounting the adapter on and removing the adapter from the arm.

According to an aspect of the invention which will be able to be used with all or some of the above features, said device comprises an assembly provided with the terminal part of the drive arm, also called wiper holder, a connection interface and said intermediate part, called clamp, said assembly being suitable for occupying a working position in which said interface is free relative to said terminal part and a so-called service position in which said interface is retained in an oriented manner inside said terminal part by said clamp.

At least a part of said clamp is configured in such a way as to be able to be manipulated to pass from the working position to the service position.

Said assembly also comprises at least one first snug situated on one of the elements out of said clamp and said interface, and at least one recess, situated on the other element, said first snug or snugs being suitable for being housed in said recess or recesses in the service position.

Said clamp advantageously comprises forms suitable for guiding said first snug or snugs towards said recess or recesses.

According to different embodiments of this aspect of the invention, which will be able to be taken together or separately:
- said recess or recesses are situated on said clamp and define a first abutment,
- said first snug or snugs is/are cylindrical,
- the forms suitable for guiding said first snug or snugs towards said recess or recesses is/are guiding slopes,
- said guiding slopes form one or more funnels,
- said clamp comprises at least one second abutment suitable for preventing said interface from pivoting relative to said clamp,
- said second abutment or abutments is/are configured to bear on said interface, in the service position, at a distance from said first snug or snugs,
- said interface has means suitable for immobilizing it on a so-called mechanical connector fixed to said wiper, in the working position,
- said means are second snugs, different from the first snug or snugs,
- said second snugs are cylindrical and suitable for being retained by key-forms, said key-forms being at least partly cylindrical and belonging to said mechanical connector,
- said clamp comprises a button making it possible to pass it from said working position to said service position, said button being mobile along a slot situated on the said terminal part and oriented in said direction of mounting and/or removal of the adapter in said terminal part,
- said slot is situated on a face of said terminal part intended to be situated opposite the wiper.

According to a variant, said device comprises an assembly provided with the terminal part of the drive arm, also called wiper holder, a connection interface and said lever, said assembly being suitable for occupying a working position in which said interface is free relative to said terminal part and a so-called service position in which said interface is retained in an oriented manner inside said terminal part by said lever.

At least a part of said lever is configured in such a way as to be able to be manipulated to pass from the working position to the service position.

Said assembly also comprises at least one first snug situated on one of the elements out of said lever and said interface, and at least one recess, situated on the other element, said first snug or snugs being suitable for being housed in said recess or recesses in the service position.

According to different embodiments of this aspect of the invention, which will be able to be taken together or separately:
- said assembly comprises at least one first dog point on one of the elements out of said lever and said interface, and at least one recess, situated on the other element, said recess or recesses being suitable for retaining said first dog point or points in the service position,
- said first dog point or points is/are cylindrical,
- said recess or recesses is/are situated on said lever,
- said recess or recesses is/are rotationally mobile,
- said recess or recesses defines/define a first abutment,
- said recess or recesses is/are hooks,
- said hooks are, at least partly, cylindrical,
- said hooks are open and made of the same material as said lever,
- said lever and/or said wiper holder define a second abutment suitable for preventing said interface from pivoting inside said terminal part in the service position,
- said interface has an outer geometry suitable for cooperating with said second abutment,
- said lever comprises a handle making it possible to pass it from said working position to said service position,
- said handle covers at least a part of said wiper holder,
- said handle is situated on a face of said wiper holder, intended to be opposite the wiper,
- said lever is configured in such a way that the handle adopts, in the working position, a position parallel to the longitudinal direction of the wiper holder,
- said lever is configured in such a way that the handle adopts, in the service position, a position orthogonal to the longitudinal direction of the wiper holder,
- the terminal part comprises a window for said lever to pass through,
- said assembly comprises an additional part securely attached to the terminal part which is configured to allow an articulation between said lever and said terminal part,
- the protruding part of the locking means is made of the same material as a body of the lever comprising said hooks,
- said protruding part of parts defines/define a third abutment suitable for preventing the retraction of said snug or snugs in the working position,
- said protruding part or parts is/are situated at the level of the hooks,
- said snug or snugs and/or said opening or openings is/are configured to allow the retraction of said snug or snugs in the service position.

The mounting operations will thus be more intuitive because they involve one part, namely the clamp or the lever, that is externally visible.

Furthermore, by virtue of the guiding of the interface relative to the clamp or to the lever, the risk of misoperation is reduced and the mounting of a spare wiper is simplified, in particular with regard to the connection of the interface to the wiper.

The operator can, in this way, manoeuvre the clamp or the lever to bring the wiper from the service position to the working position, a reliable hydraulic and/or electrical coupling thus being obtained by virtue of said interface.

The intuitive aspect of the manoeuvres required for the mounting/removal of the wiper is thus reinforced.

Generally, said connection interface comprises at least one hydraulic connector and/or one electrical connector as well as means ensuring the locking of the electrical connector to said hydraulic connector.

Furthermore, said interface has means suitable for immobilizing it on a connector of the wiper in the working position, said means being second dog points, different from the first dog point or points. Said second dog points are cylindrical and suitable for being retained by key-forms, said key-forms being at least partly cylindrical and belonging to said connector of the wiper.

The invention also relates to a vehicle windscreen wiping system comprising a wiper, a drive arm or wiper holder and a connection device as described previously, making it possible to attach said wiper to said wiper holder.

The invention will be better understood, and other aims, details, features an advantages thereof will become more clearly apparent from the following detailed explanatory description of at least one embodiment of the invention given as a purely illustrative and nonlimiting example, with reference to the attached schematic drawings.

Figure 2:
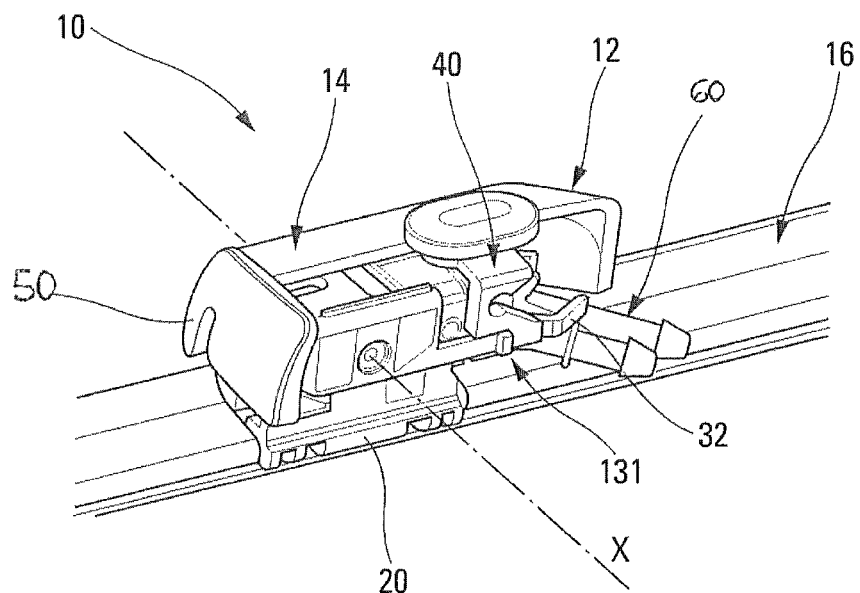
Figure 3:
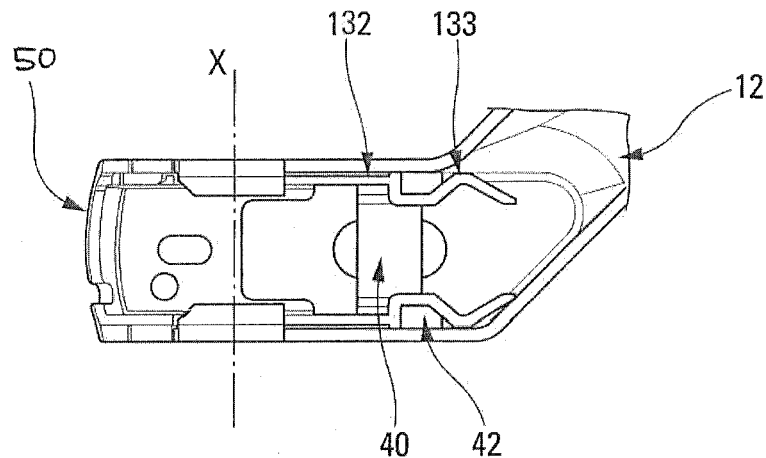
Figure 4:
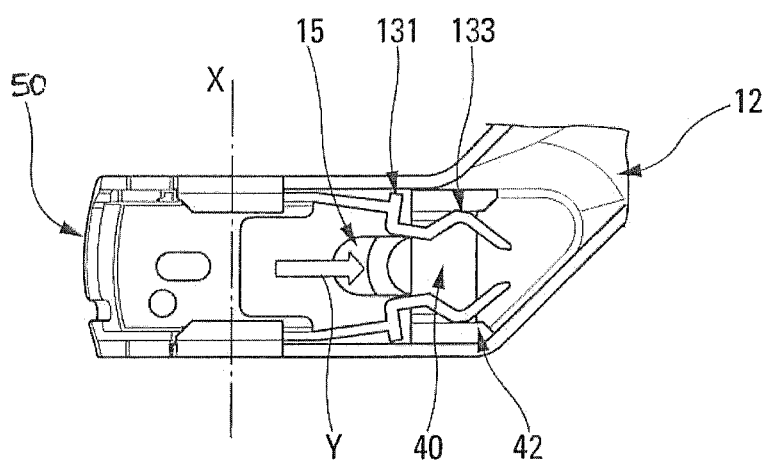
Figure 5:
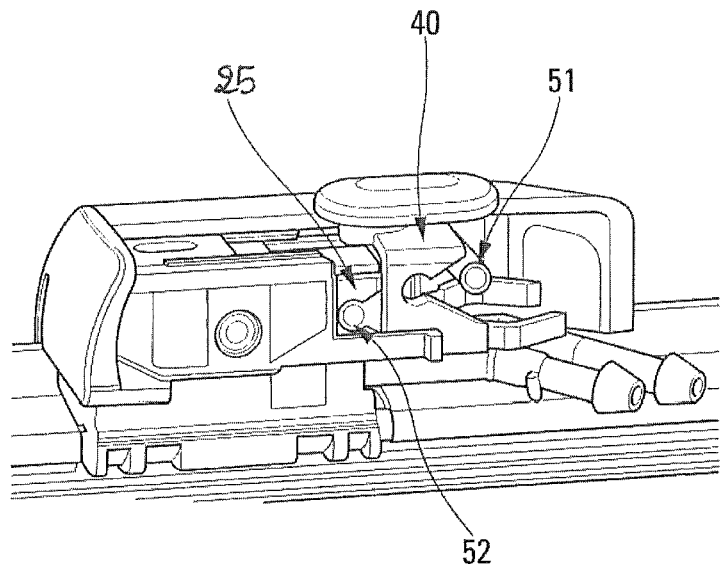
Figure 6:
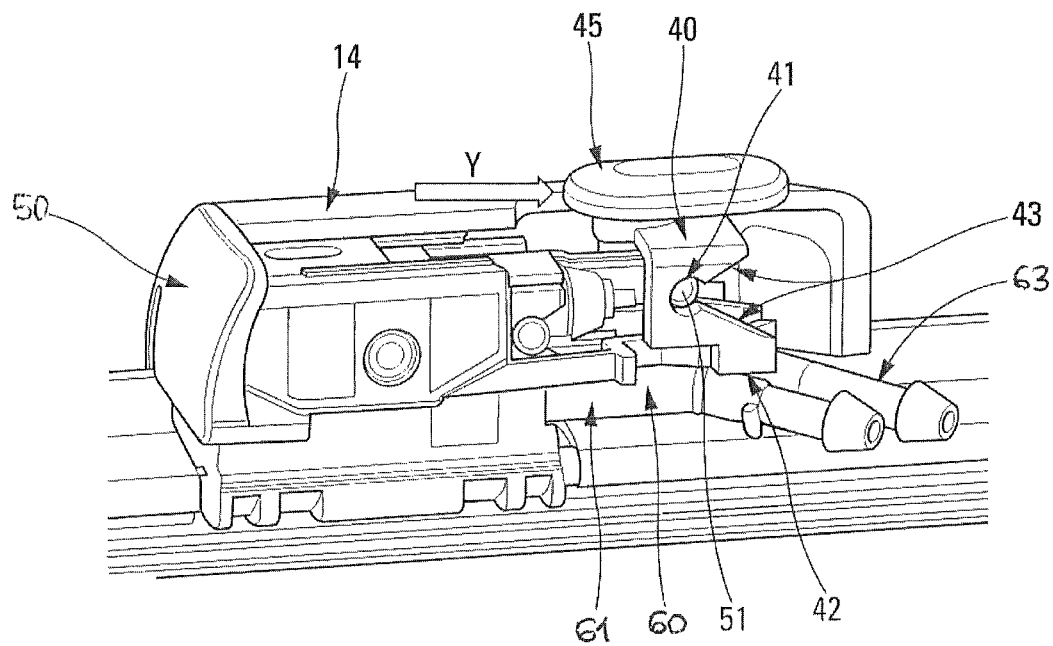
Figure 7:
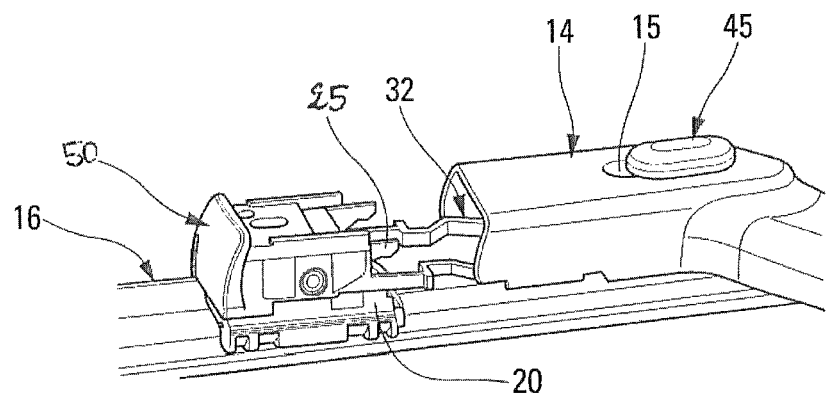
Figure 8:
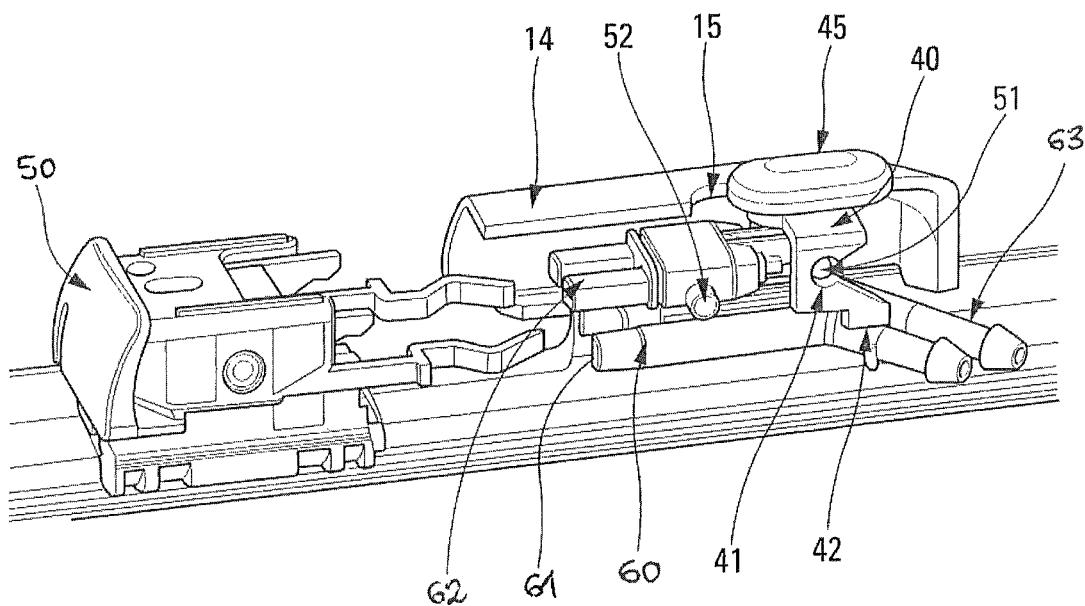
Figure 9:
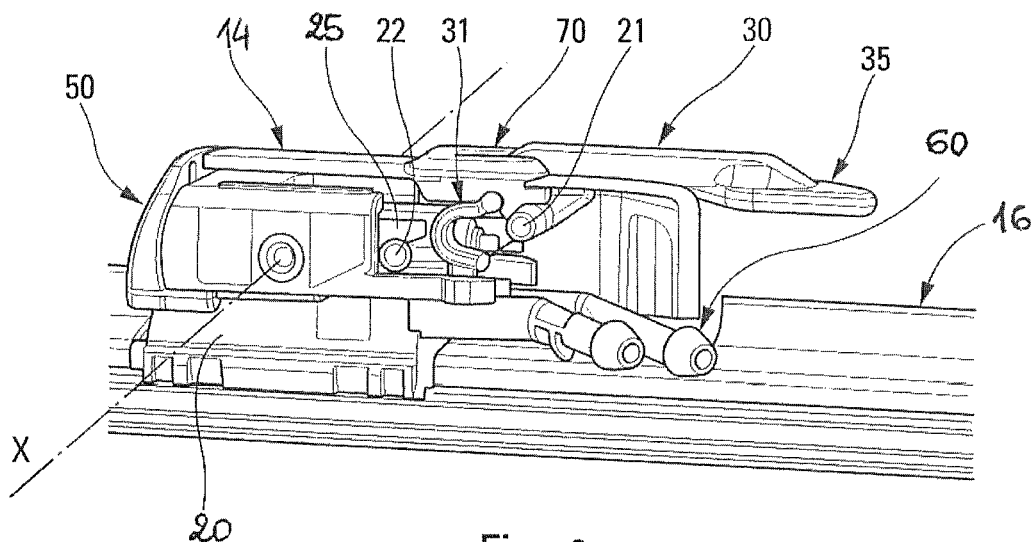
Figure 10:
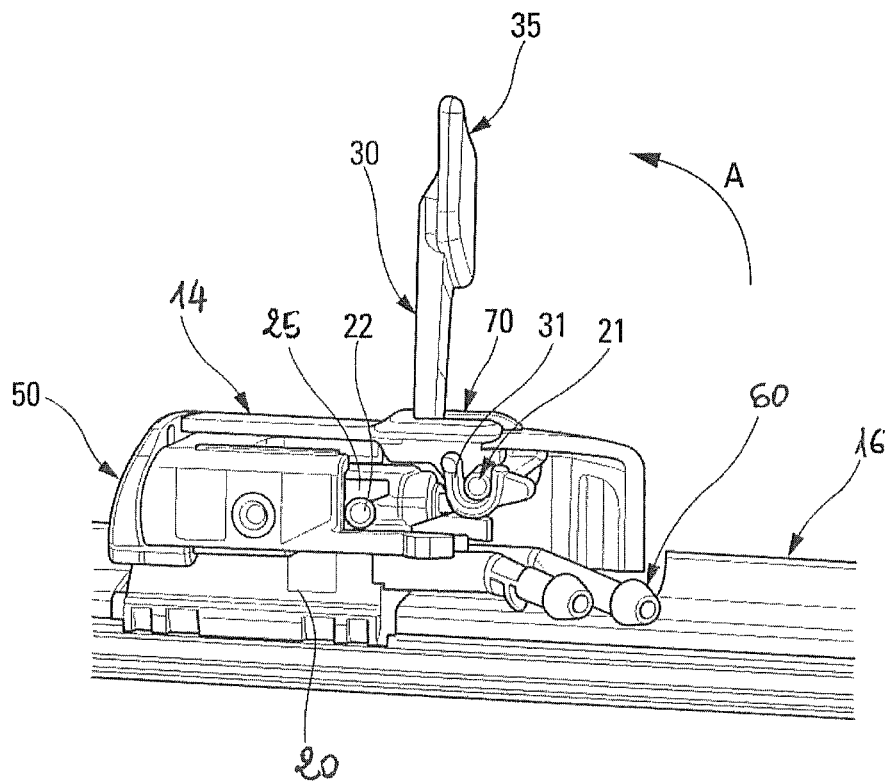
Figure 11:
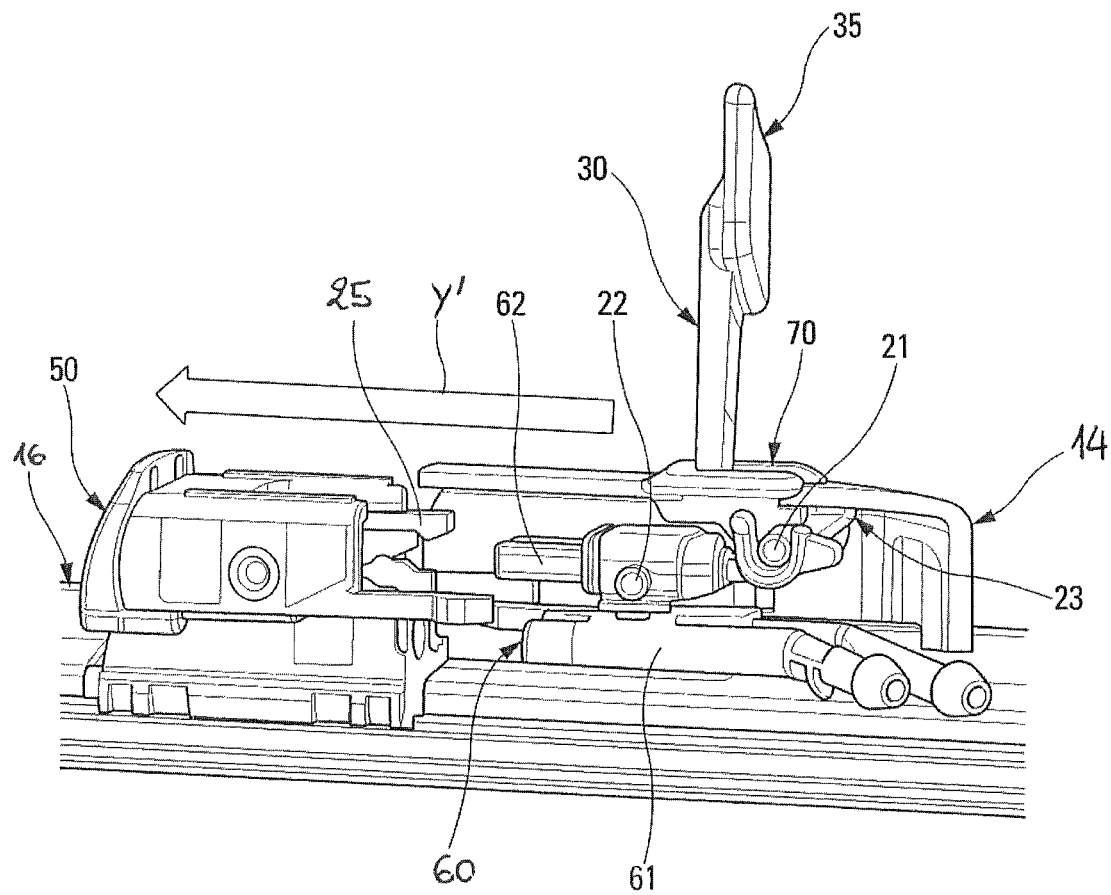
Figure 12:
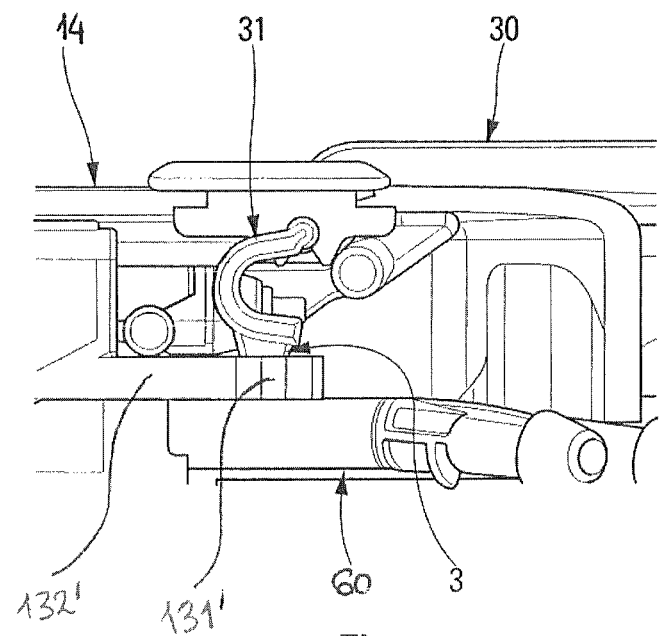
Figure 13:
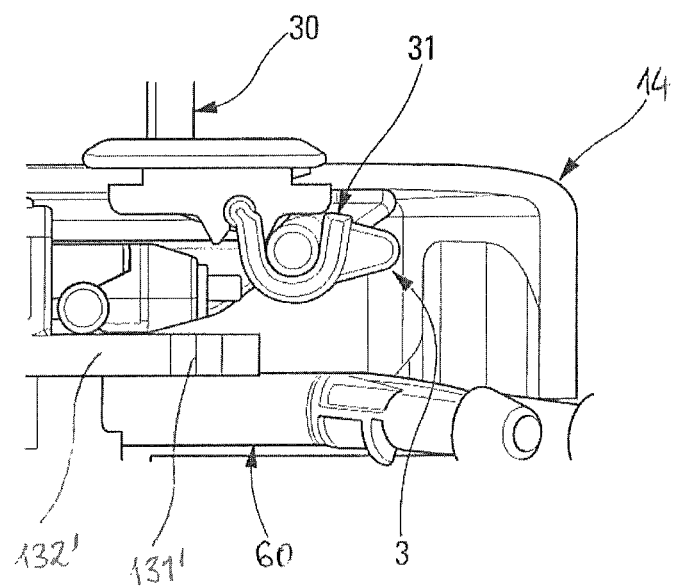
Figure 14:
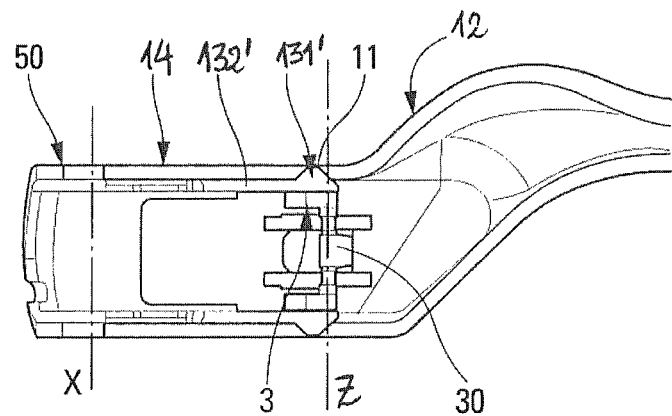
Figure 15:
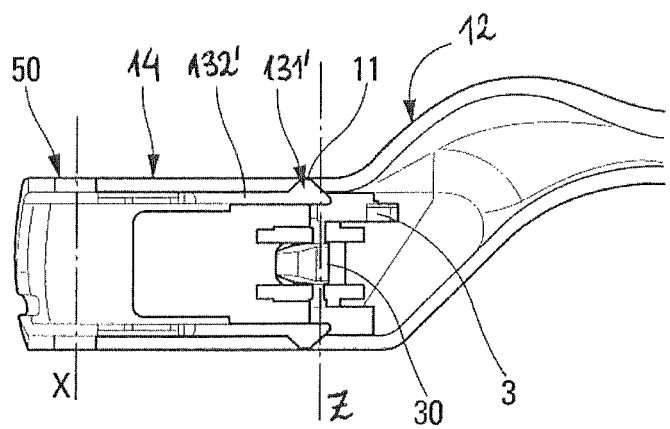
Figure 16:
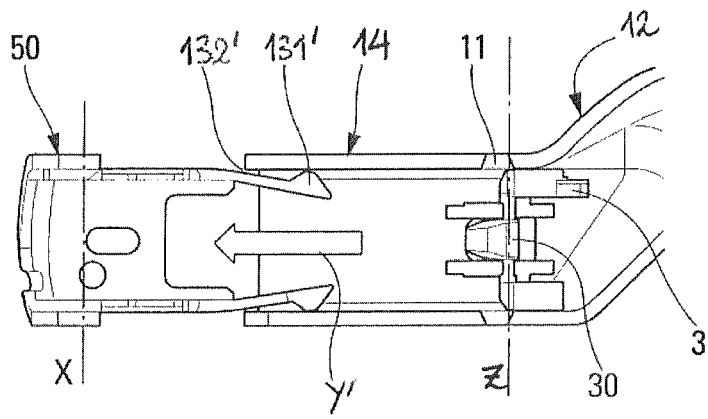
Figure 17:
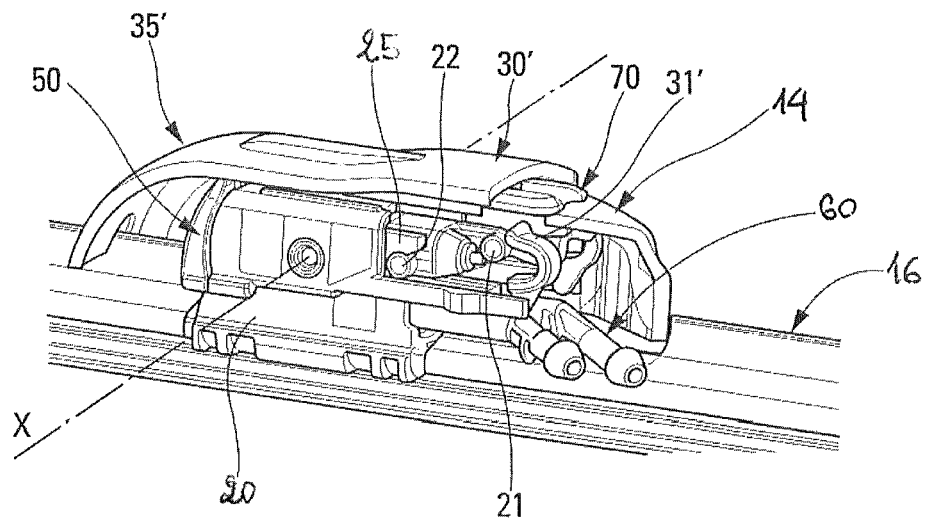
Figure 18:
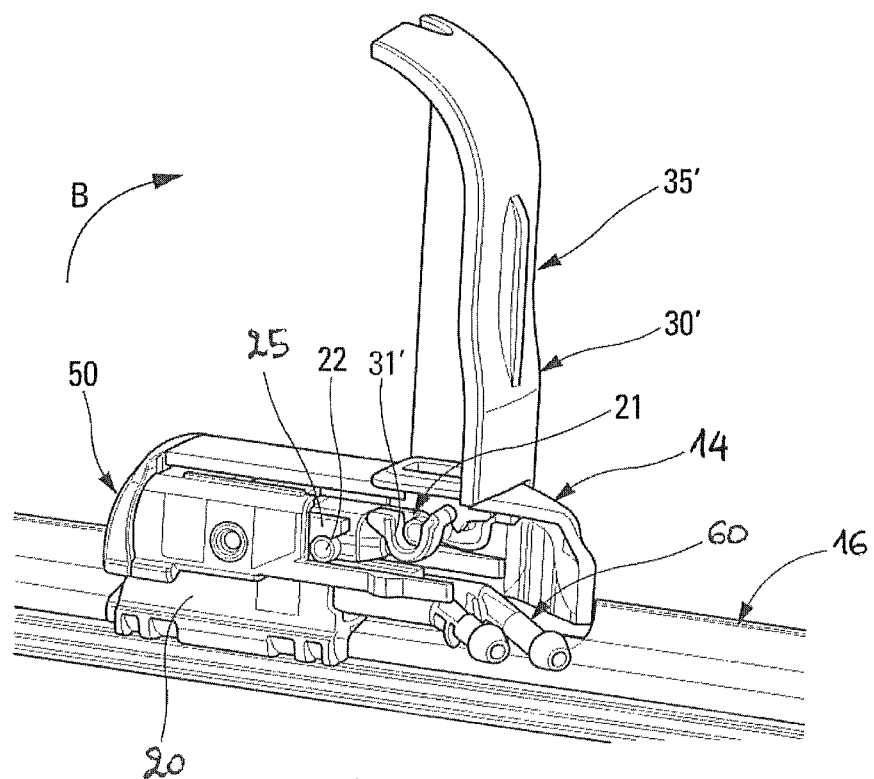
Figure 19:
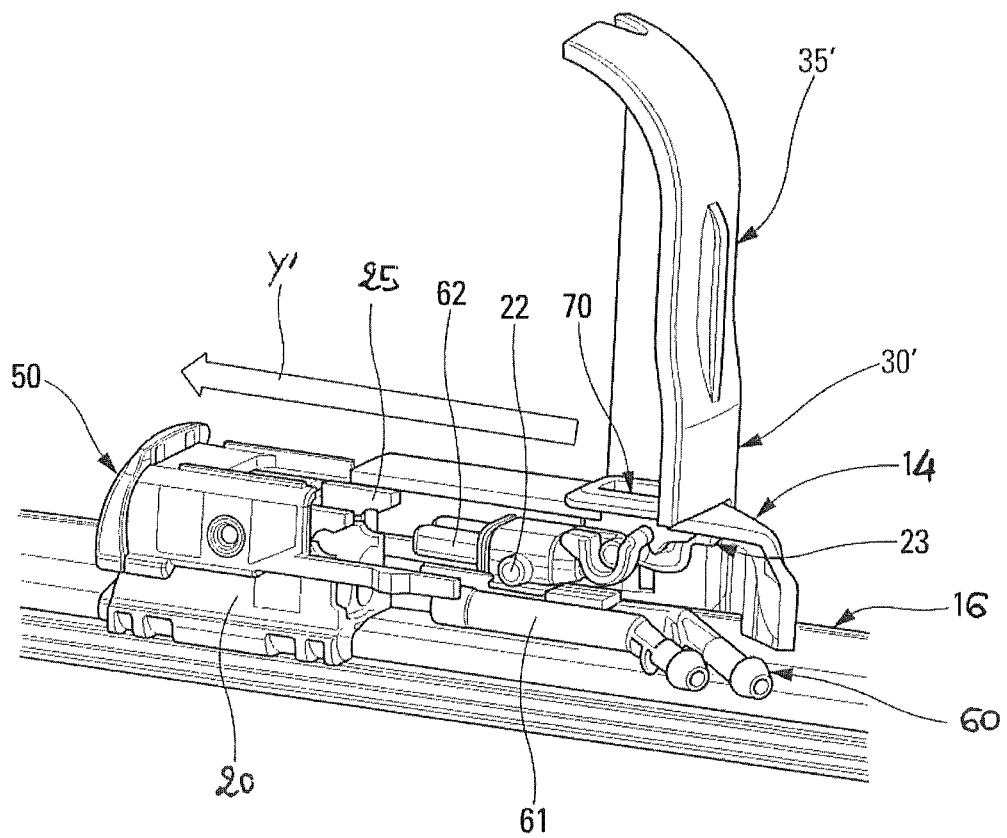
Figure 20:
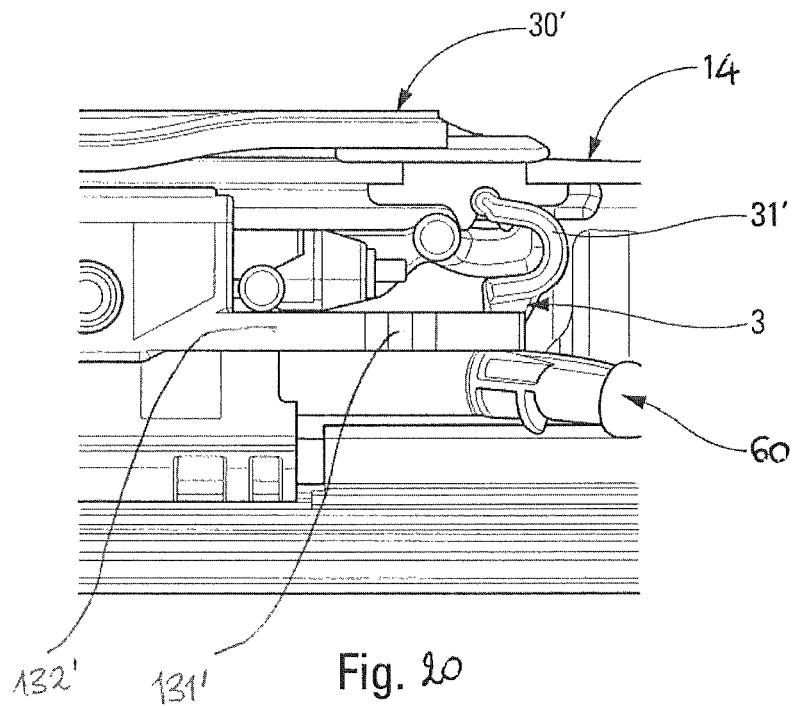
Figure 21:
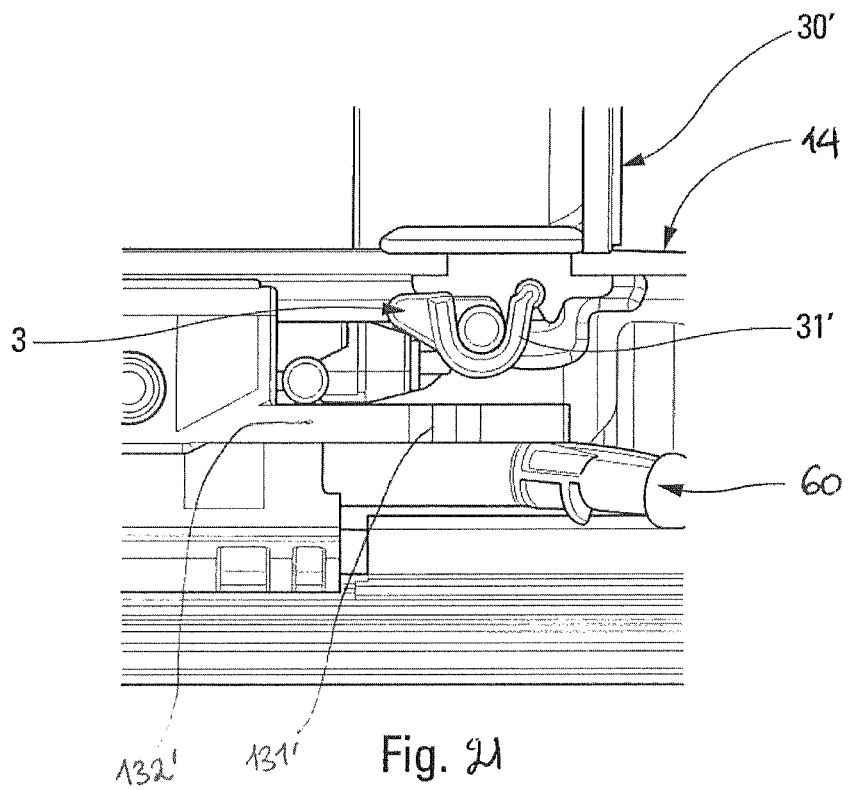
Figure 22:
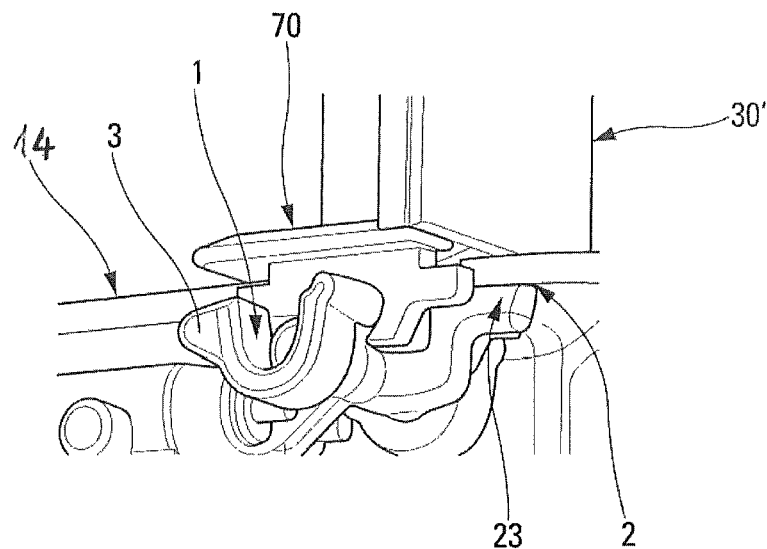
Figure 23:
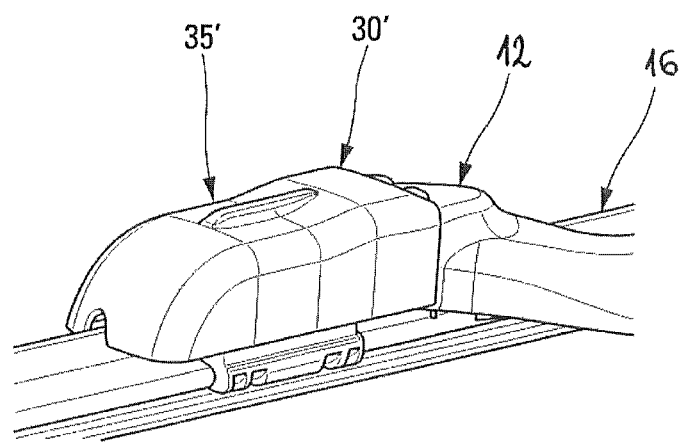

In these drawings:

FIG. 1 is a perspective view of a fixing device according to the invention, in a nominal position immobilizing the adapter in the arm, FIG. 2 is the same view as in FIG. 1, the arm being cut away to render the connector, the adapter and the clamp visible, FIG. 3 is a view from below of the device according to the invention, in the nominal position of immobilization of the adapter in the arm, only the arm, the adapter and the clamp being represented, FIG. 4 is also a view from below of the device according to the invention, but in the position of removal of the adapter from the arm, only the arm, the adapter and the clamp being represented, FIG. 5 is a repeat of FIG. 2 from a different viewing angle, FIG. 6 is a repeat of FIG. 5 and makes it possible to view how the clamp of the invention is manipulated to drive the connection interface from the working position to the service position, FIG. 7 is a perspective view of the assembly according to the invention, in the service position, FIG. 8 is the same view as in FIG. 7, the terminal part of the wiper holder being cut away to render the connection interface retained by the clamp inside said terminal part visible, FIG. 9 is a perspective view partially representing an exemplary embodiment of a fixing device, according to the invention and of the associated wiping system, in the working position, the terminal part of the wiper holder being cut away to render the connection interface, the intermediate part called lever, and the connector and the adapter of said system visible, FIG. 10 is a repeat of FIG. 9 and makes it possible to view how the lever is manipulated to drive the interface from the working position to the service position, FIG. 11 is a repeat of FIGS. 9 and 10 when removing the wiper from said system, FIG. 12 is a detail view of the connection device of the wiping system of FIGS. 9 to 11, in the working position, at the level of the parts of the interface and of the lever that cooperate with one another, FIG. 13 is a repeat of FIG. 12 in a configuration close to the service position, FIG. 14 is a view from below of the wiping system connection device of FIGS. 9 to 13, in the working position, only the wiper holder, the adapter and the lever being represented, FIG. 15 is a repeat of FIG. 14, the system being in the service position, FIG. 16 is a repeat of FIGS. 14 and 15 when removing the wiper, FIG. 17 is a perspective view partially representing another exemplary embodiment of the wiping system according to the invention, in the working position, the terminal part of the wiper holder and the handle of the lever being cut away to render the connection interface, the detail of said lever, and the connector and the adapter of said system visible, FIG. 18 is a repeat of FIG. 17 and makes it possible to view how the lever is manipulated to drive the interface from the working position to the service position, FIG. 19 is a repeat of FIGS. 17 and 18, when removing the wiper from said system, FIG. 20 is a detail view of the connection device of the wiping system of FIGS. 17 to 19, in the working position, at the level of the parts of the interface and of the lever that cooperate with one another, FIG. 21 is a repeat of FIG. 20 in a configuration close to the service position, FIG. 22 is a detail view of said parts in the service position, FIG. 23 is a perspective view of the wiping system of FIGS. 17 to 20 in the working position.

As illustrated in the different figures, the invention relates to a wiping system 10, in particular for a motor vehicle. It comprises a windscreen wiper 16 and a drive arm 12 driving the wiper 16. The invention relates also to a device for connecting the wiper to the arm 12. Said connection device comprises a connector 20 intended to be fixed to the wiper 16 and an adapter 15 for coupling the connector 20 to said arm 12. In FIGS. 1 and 2, the adapter 50 is represented in a nominal immobilizing position in the arm 12.

The mechanical connector 20 is a part which here is crimped onto the wiper 16, whereas the adapter 50 is an intermediate part which enables the connector 20 to be fixed to the arm 12. These two parts will be able to be linked to one another by a transverse axis which allows their relative rotation, in a plane at right angles to the windscreen and passing through the arm 12. This transverse axis X can be seen in FIG. 2.

The nominal position is here ensured by snugs 131 belonging to the adapter 50 which are fitted into openings 114 of the arm 12. There are preferably two of said snugs 131, each belonging to a flexible tab 32 of the adapter 50. In practice, the adapter 50 comprises two flexible tabs 32 which extend, in a direction at right angles to the transverse axis X, to the arm 12. These two flexible tabs 32 will be able to be situated on each side of the adapter 50, symmetrically in relation to a plane at right angles to the transverse axis X.

The openings 114 here are voids, preferably emergent, situated in a distal part of the arm 12 called terminal part or head of the arm 12 hereinbelow. The openings 114 have a form making it possible to house said snugs 131. These voids can be obtained directly when forming the arm 12, or by subsequent treatment, for example by machining operations performed locally on the head of the arm 12. There are preferably two of these openings 114, situated on each side of the head of the arm 12, symmetrically in relation to a plane at right angles to the transverse axis X.

The respective size of the snugs 131 and of the voids 114 prevents their manipulation by a user. In other words, the snugs 131, by their dimensioning and by the dimensioning of the voids 114, are configured so that a user cannot release them manually, notably because of their small section and/or the significant thickness of the walls of the head of the arm 12.

As can be seen in FIG. 2, according to a first embodiment, abutments 133 will be able to be situated in the extension of said snugs 131, on the same tab 32 made of the same material as the adapter 50. The function of these abutments 133 is illustrated in FIGS. 3 and 4.

The snugs 131 can then have a parallelepipedal, cylindrical, pyramidal or any other form provided that they are suitable for being housed inside the openings 114 of the arm 12.

FIG. 3 is a view from below of the device according to the invention, in the nominal position of immobilization of the adapter 50 in the arm 12, only the arm 12, the adapter 50 and an intermediate part 40 of the connection device are represented.

The intermediate part 40 is called a clamp. The clamp 40 is translationally mobile in the arm 12 in a direction of mounting/removal of the adapter 50 in the arm 12. This direction of mounting/removal is at right angles to the transverse axis X and is identified by an arrow Y in FIG. 4, the arrow Y being oriented in the direction of removal of the adapter 50 relative to the arm 12.

The clamp 40 will also be able to include cams 42. In the nominal immobilizing position, as can be seen in FIG. 2, these cams 42 do not contribute to the positioning of the adapter 50 which, as already explained, is immobilized by the snugs 131 fitted into the voids 114.

However, in the removal position, as illustrated in FIG. 4, these cams 42 act on the abutments 133 so as to extract the snugs 131 from the openings 114 of the arm 12, by causing the tabs 32 of the adapter to flex, in a direction of retraction comprising a component parallel to the transverse axis X. It is interesting to note that these cams have forms which facilitate the actuation of the abutments 133. Said forms are slopes, such as chamfers, for example.

As has just been described, the holding of the wiper 16 on the arm 12 is here performed using two flexible tabs 32 belonging to the adapter 50. These two flexible tabs 32 ensure that the wiper 16 is held by virtue of the snugs 131 which are housed in the openings 114 of the arm 12. Generally, it will be understood that said adapter 50 comprises means for holding it onto the arm 12 in a nominal immobilizing position, here the snugs 131 linked to the flexible tabs 32, and said clamp 40 is designed to be mobile in the arm 12 relative to the adapter 50. Furthermore, said clamp 40 comprises means for releasing said holding means, here said cams 42 acting on said flexible tabs 32. In this way, the mounting and/or the removal of the adapter 50 on/from the arm 12 is/are allowed.

As already stated, the snugs 131 are not manually accessible because of their small size. Only a displacement, for example a translational displacement, of said clamp 40 in the arm 12 can cause the snugs 131 to be released and thus allow the uncoupling of the adapter 50 and of the arm 12; the cams 42 of the clamp 40 act on the flexible tabs 32 to extract the snugs 131 from the openings 114 of the arm 12.

The clamp 40 will be able to include a button 45. By virtue of said button 45, the clamp 40 can be accessed in the nominal immobilizing position, in the position of removal and when mounting the adapter 50 in the arm 12. Thus, the button 45 makes it possible to switch the device from the nominal immobilizing position to the removal position.

More particularly, said button 45 is mobile along a slot 15. Said slot 15 is situated on the arm 12 and oriented in the direction of mounting/removal. As can be seen in FIG. 4, this slot 15 is situated on a face of said arm 12 intended to be situated opposite the wiper 16. It will be able to be situated on one or more other faces of the arm 12.

It should be noted that the head of the arm 12 is designed to partly cover said clamp 40, without covering the button 45.

FIG. 4 illustrates a position in which the button 45 is actuated in the slot 15 in the direction of removal of the adapter 50. The actuation of the button 45 causes the clamp 40 to actuate the flexing of the flexible tabs 32 by contact with those through the cams 42, here made of the same material as said clamp 40. It is then possible to pull longitudinally on the wiper 16 to dismantle it from the arm 12.

For reassembly, the same operations are performed in reverse.

It should be noted that variant embodiment are of course possible. Notably, it is also possible to envisage, in an additional embodiment, that the device described above has at least one additional function. For example, preventing a hydraulic and/or electrical connection interface, present in the head of the arm 12, from being retained by the connector 20 during the movement of separation between the wiper 16 and the arm 12. This additional embodiment is described hereinbelow in this description with FIG. 5 et seq.

Said connection device here comprises a connection interface 60. This connection interface 60 makes it possible to supply the wiper 16 with windscreen washer liquid and/or electricity when it is designed to be able to heat the structure of said wiper 16, for example.

In a so-called working position, the interface 60 is free relative to said terminal part 14 but it is held relative to the wiper 16. In said working position, the wiper is then in the nominal immobilizing position described above.

The holding of the interface 60 relative to the wiper 16 is then performed by the connector 20 which has characteristic forms making it possible to retain said connection interface 60.

These characteristic forms can be seen in FIG. 5. They are key-forms 25, partly cylindrical, which cooperate with snugs 52 belonging to the connection interface 60. The key-forms 25 are not closed, they each have an opening used by each of the snugs 52 of the connection interface to be housed therein. There are preferably two of these snugs 52 of the connection interface, situated on lateral faces of the interface 60, opposite one another relative to a direction of longitudinal extension of said interface 60, the length of said interface 60 being oriented in the longitudinal direction of the terminal part 14.

These snugs 52 of the connection interface will be called second snugs hereinbelow, for contrast with the first snugs 51 which also belong to the connection interface 60 but which have another function.

Said first snugs 51 can be seen in FIG. 5; their function is advantageously illustrated in FIG. 6. There are preferably two of these first snugs 51, situated on the lateral faces of the interface 60, opposite one another relative to the longitudinal direction of said interface 60. It should be noted that said second snugs 52 are closer to the mechanical connector 20 than said first snugs 51 can be.

The first snugs 51 are particularly advantageous because they participate in the switching of the assembly according to the invention from the working position to a so-called service position. The service position is the position for which the wiper 16 is separated from the wiper holder 12. In the service position, the interface 60 is retained in an oriented manner inside the terminal part 14. This retention is advantageously permitted by said clamp 40.

In practice, said first snugs 51 are able to come into contact with the clamp 40, in particular in recesses 41 thereof. The entry of the snugs 51 into the recesses 41 is facilitated by guiding forms 43, namely guiding slopes which, when coupled, form funnels. The first snugs 51 are preferably cylindrical. The recesses 41 act as first abutments between the interface 60 and the clamp 40. This is why any other form can be envisaged for said first snugs which can also be parallelepipedal or pyramidal, for example.

The clamp 40 will also be able to be provided with second abutments 42 which prevent the interface 60 from pivoting relative thereto, in particular in the case of cylindrical first snugs 51. These second abutments 42 prevent the pivoting of said interface in the terminal part upon the uncoupling of the wiper 16 from the terminal part 14. In practice, said second abutments 42 are configured to bear on the interface 60, in particular on the liquid ducts 63 of a hydraulic connector 61 belonging to the connection interface 60.

It should be noted that, in the working position, the clamp 40 does not advantageously enter into contact with the interface 60 as can be seen in FIG. 5.

In FIG. 7, it can be seen that the interface 60 is no longer coupled to the wiper 16, the adapter 50 having been separated from the terminal part 14. This means that the second snugs 52 are no longer engaged in the key-forms 25 of the connector 20. This also means that the distal part of the tabs 32 of the adapter 50 are no longer in abutment with the connection interface 60.

FIG. 8 is the same view as FIG. 7, the terminal part of the wiper holder being cut away to show the connection interface. It can be seen here that the interface 60 is then retained by the clamp 40 inside the terminal part 14. This figure illustrates the double locking of the interface 60 inside the terminal part 14; this double locking being produced by the clamp 40, using the abutments 41 and 42 described above, and making it possible to orient the connection interface 60 to facilitate the mounting of a new wiper.

It should be noted that this invention preferably relates to the hydraulic and/or electrical connection of a wiper 16 having an embedded washing function and/or a system for heating its structure. In particular, this invention relates to the hydraulic and/or electrical connection and disconnection of the wiper 16, to or from the wiper holder 12, in a single movement when dismantling the wiper 16 from its wiper holder 12.

The description of FIGS. 3 to 5 showed that the connection interface 60 is retained on the wiper 16 via the connector 20 in the working position, namely when the wiper 16 and the wiper holder 12 are assembled, while allowing the rotation of the wiper 16 relative to the arm 12 about the axis X.

The description of FIGS. 6 to 8 introduced the clamp 40 which abuts, among other things, against the first snugs 51 of the connection interface upon the switchover from the working position to the service position; the service position corresponding to the separation between the wiper 16 and the wiper holder 12, the connection interface 60 then being kept oriented relative to the arm 12.

The separation action is performed when the clamp 40 is slid relative to the terminal part 14 of the wiper holder 12. This is permitted because a part of the clamp 40 is accessible so as to be able to be manipulated to switch from the working position to the service position, in particular by cooperation of the button 45 and of the slot 15.

The direction of mounting and/or removal is indicated by the arrow Y in FIG. 6. In the case of this arrow Y, the button 45 is actuated in the slot 15 in the direction of removal of the adapter 50—the slot 15 being particularly visible in FIGS. 7 and 8. The actuation of the button 45 causes the clamp 40 to come into abutment with the interface 60, at two points: through the first abutments 41 and the second abutments 42. It is then possible to pull longitudinally on the wiper 16 to separate it from the wiper holder 12 while retaining the interface 60 in the terminal part 14 of the wiper holder 12. As a reminder, this prevents said interface 60 from being driven by the mechanical connector 20 in its separation movement with the wiper holder 12 of the windscreen wiper.

For reassembly, the same operations are performed in reverse order.

It should be noted that, in the example described above, the connection interface 60 comprises a hydraulic connector 61 and an electrical connector 62, as can be seen in particular in FIG. 6; said interface 60 comprising means ensuring the locking of the hydraulic connector 61 on the electrical connector 62 (locking means not detailed in the figures).

Here, the first and second snugs 51, 52 provided on the electrical connector 62 rather than on the hydraulic connector 61. It is however possible for them to be provided on the hydraulic connector 61.

It should also be noted that other variant embodiments are of course possible. Notably, it is also possible, in an additional embodiment, for the first and second snugs of said assembly to be situated on the clamp 40 whereas, for their part, the abutments would be situated on the interface 60.

It is also possible, in a variant embodiment, for at least a part of said intermediate parts 30, 30' to be configured in such a way as to be accessible so as to be able to be manipulated in rotation to switch from the working position to the service position.

The descriptions of FIGS. 9 to 23 which follows sets out to detail this variant.

Said terminal part 14 forms, with the connection interface 60 and the intermediate part 30, 30', an assembly. As a reminder, this assembly is able to occupy the working position in which said interface 60 is free relative to said terminal part 14 and the service position in which said interface 60 is retained in an oriented manner relative to said terminal part 14 by said intermediate part 30, 30'.

As already stated, at least a part of said intermediate parts 30, 30' is configured in such a way as to be accessible so as to be able to be manipulated in rotation, in particular about an axis Z of the terminal part 14, to switch from the working position to the service position. Thus, there is a lever available, which can advantageously be manipulated from outside.

Said axis of rotation Z, belonging to the terminal part 14, is advantageously provided parallel to the axis of rotation X of the adapter on the mechanical connector.

As in the preceding embodiment, said adapter 50 is configured to be mounted on the wiper holder 16 in a direction Y', called direction of mounting/removal, situated in a plane at right angles to said first axis of rotation X.

FIGS. 9, 10, 11 and 18 show first dog points 21 situated on the connection interface 60, and recesses 31, 31' situated on the intermediate part 30, 30', called lever in this embodiment. There are preferably two of these first dog points 21, situated on the lateral faces of the interface 60, opposite one another relative to the longitudinal direction of said interface 60. These first dog points 21 are preferably cylindrical.

Said recesses 31, 31' are suitable for retaining said first dog points 21, in particular in the service position. They are situated on the lever 30, 30' and there are preferably two of them, placed facing said dog points 21. They are rotationally mobile, like the lever 30, 30', and define a first abutment 1 for said first dog points 21. This first abutment 1 can be seen in particular in FIG. 22 in the relevant variant of this embodiment.

Said recesses 31, 31' are hooks, at least partly cylindrical, made of the same material as said lever 30, 30'.

The recesses 31, 31' act as first abutments 1 between the interface 60 and the lever 30, 30'. This is why any other form can be envisaged for said first dog points 21 which can also be parallelepipedal or pyramidal, for example.

The first dog points 21 are particularly advantageous because they participate in the switchover of the assembly according to the present embodiment from the working position to the service position.

In the working position, the holding of the interface 60 relative to the wiper 16 is produced by the connector 20 as already described. In the case of the present embodiment, the key-forms 25 cooperate with second dog points which are referenced 22.

It should be noted that, in the working position, the lever does not advantageously enter into contact with the interface 60 as can be seen in FIGS. 9 and 17.

Also, FIG. 22 shows a second abutment 2 defined by the terminal part 14. This second abutment is suitable for preventing said interface 60 from pivoting inside said terminal part 14, in particular in the case of cylindrical first dog points 21. This is made possible by the outer geometry 23 of said interface 60 which is suitable for cooperating with said second abutment 2. This second abutment 2 prevents the pivoting of said interface 60 in the terminal part 14 when the wiper 16 is uncoupled from the terminal part 14. In practice, said second abutment 2 is configured to press on the interface 60, in particular on a substantially planar part 23 of said interface 60. Said substantially planar part 23 is preferably situated on the side of said interface 60 opposite its distal end relative to said first dog points.

A double locking of said interface 60 inside the terminal part 14 is therefore produced using the first and second abutments 1, 2 described above, and, in the embodiments illustrated, it is said first and second abutments 1, 2 which, with the forms provided as counterpart on the connection interface 60, namely the first dog point or points 21 and the substantially planar part 23, make it possible to orient the connection interface 60 to facilitate the mounting of a new wiper.

The switchover from the working position to the service position can be seen in particular in FIGS. 10 and 18.

The assembly according to the present embodiment, in the service position, is illustrated in FIGS. 11 and 19.

It can be seen here that the interface 60 is retained by the hooks 31, 31' of the lever 30, 30' inside the terminal part 14. These figures also illustrate the second blocking of the interface 60 inside the terminal part 14 via the substantially planar part 23 of said interface.

It can be seen here that the second dog points 22 are no longer engaged in the key-forms 42 of the connector 40.

It can also be seen there that the interface 20 is no longer coupled to the wiper 16, the adapter 50 having been dismantled from the terminal part 14.

In this embodiment, in addition to the connector 20 and the coupling adapter 50 for coupling the connector 20 to said wiper holder 12, the connection device according to the invention will be able to include an assembly as described above.

FIGS. 14, 15 and 16 illustrate the features of this embodiment that enable the adapter to be immobilized/released in the arm by virtue of said lever. More specifically, said lever 30, 30' comprises locking means 3 for said holding means 131' of the adapter, so as to retain said adapter 50 on the wiper holder 12.

The nominal immobilizing position is here ensured by snugs 131' belonging to the adapter 50 which fit into openings 11 of the wiper holder 12. There are preferably two of said snugs 131', each belonging to a flexible tab 132' of the adapter 50. In practice, the adapter 50 comprises two flexible tabs 132' which extend, in a direction at right angles to the transverse axis X, to the wiper holder 12. These two flexible tabs 132' will be able to be situated on each side of the adapter 50, symmetrically relative to a plane at right angles to the transverse axis X.

The openings 11 here are voids, preferably emergent, situated in the terminal part 14. The openings 11 have a form making it possible to house said snugs 131'. These voids may be obtained directly in the forming of the wiper holder 12, or by subsequent treatment, by example by machining operations performed locally on the terminal part 14. There are preferably two of these snugs 131', situated on each side of the terminal part 14, symmetrically relative to a plane at right angles to the transverse axis X.

The respective size of the snugs 131' and of the voids 11 here prevents their being manipulated by a user. In other words, the snugs 131', by their dimensioning and by the dimensioning of the voids 11, are configured in such a way that a user cannot release them manually, notably because of their small section and/or the significant thickness of the walls of the terminal part 14.

However, the user will be able to release said snugs 131' from the openings 11 in a way that will be described below.

FIGS. 12 and 20 give detail views of the locking means 3 of the device according to the invention. Said locking means 3 comprise at least one protruding part 3 made of the same material as the lever 30, 30'. Said protruding parts 3 define a third abutment suitable for preventing the retraction of said snugs 131' in the nominal immobilizing position. There are preferably two of them, each situated at the level of the hooks 31, 31' in the case of a lever used to retain a connection interface. They are rotationally mobile like the latter.

Moreover, said snugs 131' can be retracted in the direction of retraction already described in the description of the preceding embodiment. In practice, said snugs 131' are, as described above, situated on a tab 132' made of the same material as the adapter 50. Their retraction is obtained by the flexing of said tabs 132' of the adapter 50.

In the nominal immobilizing position, the protruding parts 3 abut against said tabs 132' and prevent their flexing in the direction of retraction.

FIG. 15 is also a view from below of the device according to the invention, the holding means 131' not being locked, only the wiper holder 12, the adapter 50 and the lever 30, 30' being represented.

The lever 30, 30' has been pivoted relative to the second axis of rotation Z so as to release the third abutments 3.

In FIGS. 13 and 21, it can be seen in particular that the protruding parts 3 no longer prevent the flexing of the tabs 132' of the adapter 50; the protruding parts 3 no longer abutting with said tabs 132'.

FIG. 16 is yet another view from below of the device according to the invention, the holding means 3 being retracted into the terminal part 14, only the wiper holder 12, the adapter 50 and the lever 30 being represented.

This figure shows the direction Y' of mounting/removal according to which said adapter 50 is configured to be mounted on the wiper holder 12. In FIG. 16, the direction given to this direction Y' is that of the removal of the adapter 50 from said terminal part 14. Said direction Y' is also referenced in FIGS. 11 and 19.

Said snugs 131' and said openings 11 are configured to allow the retraction of said snugs. In practice, they have forms which facilitate their release from one another. Said forms are, for example, slopes, such as chamfers.

Thus, as illustrated in FIG. 16, these forms act in such a way as to facilitate the extraction of the snugs 131' from the openings 11 of the wiper holder 12, by causing the tabs 132' of the adapter 50 to flex, in the direction of retraction.

As already stated, the snugs 131' are not manually accessible because of their small size. Only a displacement, for example rotational, of said lever 30, 30' relative to the terminal part 14, can allow the releasing of the locking means and thus allow the uncoupling of the adapter 50 and of the arm 12; the snugs 51 then being free to exit the openings 11 of the arm 12.

To complement the description of the present embodiment, it should be noted that the dismantling action can be performed once the lever 30, 30' has been pivoted relative to the terminal part 14 of the wiper holder 12. This is permitted because at least a part of the lever 30, 30' is externally accessible. This part forms, for example, a handle 35, 35' of the lever 30, 30'.

Said handle 35, 35' covers at least a part of said wiper holder and is situated on a face of the wiper holder 12 intended to be opposite the wiper 16. This handle 35, 35' adopts, in the nominal blocking position, a position parallel to the longitudinal direction of the wiper holder 12 and, for the removal, an orthogonal position relative to the longitudinal direction of the wiper holder 12.

According to a first variant of the present embodiment illustrated in FIGS. 9 to 13, the handle 35 covers only a part of the terminal part 14 of the wiper holder 12. Furthermore, in the nominal immobilizing position, the distal part of the handle 35 is facing the side of the wiper holder 12.

To switch to the removal position, it is sufficient to subject the lever 30 to a quarter-circle rotation in the counterclockwise direction, identified by the arrow A in FIG. 10. This leads to a rotation of the hooks 31 by the same quarter circle. Said hooks 31 then retain the first dog points 21 and unlock the flexible tabs 132' in order to allow the snugs 131' to be released from the openings 11 produced in the terminal part 14 of the wiper holder 12. The user can then dismantle the wiper 16 from the wiper holder 12 by pulling longitudinally on the wiper 16 in the direction Y', while being assured that the connection interface 16 of such a wiping assembly is held in the terminal part 14.

According to a second variant of the present embodiment illustrated in FIGS. 17 to 23, the handle 35' is intended to cover the terminal part 14 of the wiper holder 12, the connector 20 and the adapter 50. The handle 35' is then a covering cap which can be clipped to the wiper 16. Furthermore, in the nominal immobilizing position, the distal part of the handle 35' faces the side opposite the wiper holder 12.

To switch to the removal position, it is sufficient to subject the lever 30' to a quarter-circle rotation in the clockwise direction, identified by the arrow B in FIG. 18. This leads to a rotation of the hooks 31' by the same quarter circle. Said hooks 31' then retain the first dog points 21 and unlock the flexible tabs 132' in order to enable the snugs 131' to be released from the openings 11 produced in the terminal part 14 of the wiper holder 12. The user can then dismantle the wiper 16 from the wiper holder 12 by pulling longitudinally on the wiper 16 in the direction Y', while being assured that the connection interface of such a wiping assembly is held in the terminal part 14.

Regarding these two variants of the present embodiment, the switchover from the service position to the working position is performed by the reverse operations.

It should be noted that, as in the examples described above, the connection interface 60 comprises a hydraulic connector 61 and an electrical connector 62, as can be seen in particular in FIGS. 11 and 19; said interface 60 comprising means ensuring the locking of the hydraulic connector 61 onto the electrical connector 62 (locking means not detailed in the figures).

Here, the first and second dog points 21, 22 are provided on the electrical connector 62 rather than on the hydraulic connector 61. It is however possible to provide them on the hydraulic connector 61.

It should also be noted that other variant embodiments are of course possible. In particular, it is also possible to envisage, in an additional embodiment, that the first and second snugs of said assembly are situated on the lever 30, 30' whereas, for their part, the abutments would be situated on the interface 60.

It should also be noted that the terminal part 14 comprises a window for the passing of said lever 30, 30'. The assembly described in this embodiment here comprises an additional part 70, securely attached to the terminal part 14, configured to allow an articulation between said lever 30, 30' and said terminal part 14.

The invention claimed is:

1. A device for fixing a windscreen wiper onto a drive arm of a wiping system, said device comprising:
   a terminal part of the arm;
   a connector configured to be fixed to the wiper;
   a coupling adapter for coupling the connector to said arm; and
   an intermediate part, said adapter comprising means for holding the adapter onto the arm in a nominal immobilizing position,
   said intermediate part being mobile inside an interior surface of said terminal part relative to the adapter, and comprising means for releasing and/or locking said holding means, to allow the adapter to be mounted on and/or removed from the arm and/or so as to retain the adapter on the arm in the nominal immobilizing position,
   wherein the means for releasing and/or locking said holding means are configured to act on the holding means so as to retract the holding means when the adapter is mounted on and/or removed from the arm.

2. The device according to claim 1, in which said adapter is linked to the connector with a degree of pivoting freedom about a first axis of rotation and said intermediate part is translationally mobile in the arm in a mounting/removal direction, situated in a plane at right angles to the axis of rotation.

3. The device according to claim 1 the holding means comprise at least one abutment capable of being retracted in a retraction direction, said direction of retraction comprising a component parallel to a first axis of rotation, the means for releasing and/or locking said holding means comprising at least one cam acting on the abutment or abutments so as to drive it/them in said direction of retraction.

4. The device according to claim 3, wherein the holding means comprise snugs suitable for being housed in a nominal immobilizing position inside one opening or openings produced in the arm, the at least one cam acting on the abutment or abutments so to extract the snugs from the opening or openings of the arm.

5. The device according to claim 4, wherein the abutment or abutments and the snugs are situated on a tab made of a same material as the adapter.

6. The device according to claim 1, further comprising:
   an assembly provided with the terminal part of the drive arm,
   a connection interface, and
   said intermediate part, which is a clamp,
   said assembly being suitable for occupying a working position in which said interface is free relative to said terminal part and a service position in which said interface is retained in an oriented manner inside said terminal part by said clamp, at least a part of said clamp being configured to be manipulated to pass from the working position to the service position, and said assembly comprising at least one first snug situated on one of the elements out of said clamp and said interface and at least one recess, situated on the other element, the at least one first snug being suitable for being housed in said at least one recess in the service position.

7. A vehicle windscreen wiping system comprising:

a windscreen wiper;

a wiper holder; and a device for fixing the windscreen wiper onto a drive arm of the wiping system, wherein the device comprises:

a terminal part of the arm;

a connector configured to be fixed to the wiper;

a coupling adapter for coupling the connector to said arm; and an intermediate part, said adapter comprising means for holding the adapter onto the arm in a nominal immobilizing position, said intermediate part being mobile inside an interior surface of said terminal part relative to the adapter, and comprising means for releasing and/or locking said holding means, to allow the adapter to be mounted on and/or removed from the arm and/or so as to retain the adapter on the arm in the nominal immobilizing position, wherein the means for releasing and/or locking said holding means are configured to act on the holding means so as to retract the holding means when the adapter is mounted on and/or removed from the arm, and wherein the windscreen wiper is attached to said wiper holder.

* * * * *